United States Patent
Hellsten

(10) Patent No.: US 11,726,199 B2
(45) Date of Patent: Aug. 15, 2023

(54) METHODS, COMPUTER PROGRAMS, RADAR SYSTEMS, ANTENNA SYSTEMS, AND FLYING PLATFORMS FOR DETECTING A HORIZONTALLY BURIED LINEAR OBJECT

(71) Applicant: SAAB AB, Linköping (SE)

(72) Inventor: Hans Hellsten, Linköping (SE)

(73) Assignee: SAAB AB, Linköping (SE)

( * ) Notice: Subject to any disclaimer, the term of this patent is extended or adjusted under 35 U.S.C. 154(b) by 109 days.

(21) Appl. No.: 16/979,093

(22) PCT Filed: Mar. 8, 2019

(86) PCT No.: PCT/SE2019/050205
§ 371 (c)(1),
(2) Date: Sep. 8, 2020

(87) PCT Pub. No.: WO2019/172833
PCT Pub. Date: Sep. 12, 2019

(65) Prior Publication Data
US 2020/0408896 A1    Dec. 31, 2020

(30) Foreign Application Priority Data
Mar. 9, 2018   (SE) .................................. 1850261-7

(51) Int. Cl.
*G01S 13/88*   (2006.01)
*G01S 13/90*   (2006.01)

(52) U.S. Cl.
CPC ............ *G01S 13/885* (2013.01); *G01S 13/90* (2013.01); *G01S 13/9011* (2013.01); *G01S 13/9019* (2019.05); *G01S 13/9076* (2019.05)

(58) Field of Classification Search
CPC ......... G01S 13/90–9094; G01S 13/885; G01S 13/88; G01V 3/30
See application file for complete search history.

(56) References Cited

U.S. PATENT DOCUMENTS 4,831,383 A    5/1989  Ohnishi et al.
5,323,162 A *  6/1994  Fujisaka ............ G01S 13/9029
                                                342/25 B
(Continued)

FOREIGN PATENT DOCUMENTS

DE   102017205649 B3 *  3/2018   ............ G01S 13/90
EP       0876621 A1     11/1998
(Continued)

OTHER PUBLICATIONS

Extended European Search Report dated Jan. 24, 2022 for European Patent Application No. 19763201.1, 12 pages.
(Continued)

*Primary Examiner* — Matthew M Barker
(74) *Attorney, Agent, or Firm* — Sage Patent Group

(57) ABSTRACT

A method for detecting a horizontally buried linear object is provided, the horizontally buried linear object having a longitudinal extension. The method comprises moving, with a flying platform comprising a radar for synthetic aperture radar, SAR, vertical imaging, along a trajectory corresponding to a synthetic aperture. The method further comprises transmitting and receiving radar signals while moving along the trajectory corresponding to the synthetic aperture. The method also comprises forming a SAR image based on collected data representing radar signal reflections received from the ground. The method additionally comprises detecting one or more features in the formed SAR image relating to the horizontally buried linear object. Said trajectory is oriented in a direction substantially perpendicular to an expected orientation of the longitudinal extension of the horizontally buried object and traversing the horizontally buried object.

12 Claims, 5 Drawing Sheets

(56) References Cited

U.S. PATENT DOCUMENTS

| | | | | |
|---|---|---|---|---|
| 5,502,444 | A | * | 3/1996 | Kohlberg .................. G01S 7/32 342/22 |
| 5,673,050 | A | * | 9/1997 | Moussally .......... G01S 13/0209 342/25 F |
| 6,466,156 | B1 | * | 10/2002 | Ulander .............. G01S 13/9027 342/25 R |
| 6,590,519 | B2 | * | 7/2003 | Miceli ..................... G01S 13/89 701/472 |
| 7,561,096 | B2 | * | 7/2009 | Hellsten .................. G01S 7/025 342/25 A |
| 2007/0024489 | A1 | * | 2/2007 | Gerwin .................... G01V 3/17 342/25 A |
| 2010/0225531 | A1 | * | 9/2010 | Johnson .................. G01S 17/89 342/25 A |
| 2012/0105274 | A1 | * | 5/2012 | Andersson .............. G01S 13/90 342/25 A |
| 2016/0306063 | A1 | * | 10/2016 | Hyde .................... G01S 13/885 |
| 2017/0097440 | A1 | | 4/2017 | Stolarczyk |
| 2018/0284262 | A1 | * | 10/2018 | Villano ................... G01S 13/90 |
| 2019/0113647 | A1 | * | 4/2019 | Arumugam ............. G01V 3/12 |
| 2019/0137653 | A1 | * | 5/2019 | Starr ..................... B64C 39/024 |
| 2020/0142056 | A1 | * | 5/2020 | Fox ......................... G01S 13/90 |

FOREIGN PATENT DOCUMENTS

| EP | 2394184 A1 | | 12/2011 | |
|---|---|---|---|---|
| RU | 2451954 C1 | * | 5/2012 | |
| WO | WO-2014098660 A1 | * | 6/2014 | ............ G01S 13/02 |
| WO | 2017125627 A1 | | 7/2017 | |

OTHER PUBLICATIONS

Martinez-Lorenzo, Jose Angel et al.; "Physical Limitations on Detecting Tunnels Using Underground-Focusing Spotlight Synthetic Aperture Radar"; IEEE Transactions on Geoscience and Remote Sensing, vol. 49, No. 1, Jan. 2011; 6 pages.

Hellsten, Hans; "Meter-Wave Synthetic Aperture Radar for Concealed Object Detection"; Artech house, 2017, 81 pages.

Catapano, Ilaria et al.; "Airborne GPR Surveys Via Tomographic Imaging: An Analysis of the Reconstruction Capabilities"; Proceedings of the 14th International Conference on Ground Penetrating Radar, Jun. 4-8, 2012, Shanghai, China; 5 pages.

International Search Report and Written Opinion in corresponding International Application No. PCT/SE2019/050205 dated Jun. 10, 2019 (14 pages).

Ruth Janning, et al.; "Buried pipe localization using an iterative geometric clustering on GPR data"; Artificial Intelligence Review, vol. 42, nr. 3, pp. 403-425 (23 pages); published Jul. 16, 2013; DOI 10.1007/s10462-013-9410-2.

Michelangelo Villano, et al.; "Nadir Echo Removal in Synthetic Aperture Radar via Waveform Diversity and Dual-Focus Postprocessing"; IEEE Geoscience and Remote Sensing Letters, vol. 15, No. 5, May 2018; pp. 719-723 (5 Pages).

* cited by examiner

S10
Moving, with a flying platform comprising a radar for SAR vertical imaging, along a trajectory corresponding to a synthetic aperture

S20
Transmitting and receiving radar signals while moving along the trajectory corresponding to the synthetic aperture

S22
Focusing the transmitted radar signal based on a received nadir radar signal reflection

S221
Determining a flight height of the flying platform based on the received nadir radar signal reflection

S222
Determining a refractive index of the ground based on a signal strength of the received nadir radar signal reflection

S24
Transmitting and receiving a radar signal in a direction parallel to the trajectory of the flying platform using one or more dipole antennas oriented at right angles to the trajectory

S26
Excluding data relating to received radar reflections at an aperture position at nadir of the flying platform during a duration including the flying platform passing over the horizontally buried linear object

S262
Turning off the radar during said duration including the flying platform passing over the horizontally buried linear object

S264
Zeroing said data relating to received radar reflections at an aperture position at nadir of the flying platform during said duration including the flying platform passing over the horizontally buried linear object

S266
Applying zero Doppler removal

S30
Forming a SAR image based on collected data relating to radar signal reflections received from the ground

S40
Detecting one or more features in the formed SAR image relating to the horizontally buried linear object

Fig. 1

METHODS, COMPUTER PROGRAMS, RADAR SYSTEMS, ANTENNA SYSTEMS, AND FLYING PLATFORMS FOR DETECTING A HORIZONTALLY BURIED LINEAR OBJECT

CROSS-REFERENCE TO RELATED APPLICATIONS

This application is a U.S. National Stage application of PCT/SE2019/050205, filed Mar. 8, 2019 and published on Sep. 12, 2019 as WO 2019/172833, which claims the benefit of Swedish Patent Application No. 1850261-7, filed Mar. 9, 2018, all of which are hereby incorporated by reference in their entireties.

TECHNICAL FIELD

The present disclosure relates to synthetic aperture radar technology. In particular, the present disclosure relates to methods, computer programs, radar systems, antenna systems and flying platforms for detecting a horizontally buried linear object.

BACKGROUND

In many scenarios it is highly desirable to be able to form representations of subsurface structures. In addition to monitoring natural phenomena, the ability to detect man-made buried objects has many civilian and military applications.

Conventionally, synthetic aperture radar, SAR, is used for imaging of a ground surface. The imaging geometry is that of the radar aircraft traversing the area to be imaged and directing radiation to either side of the aircraft. From the backscattered signal in image of the illuminated area is attained. Large areas can thus be mapped quickly and with high precision.

Synthetic aperture enables achieving high resolutions at relatively low frequencies, thereby reducing the influence of surface clutter in applications such as detection of buried objects. SAR detection of buried objects still face challenges since the radar response from such objects is very weak.

There is thus a need in the art for improved methods for detecting buried objects using SAR technology.

SUMMARY

The present disclosure relates to a method for detecting a horizontally buried linear object. The horizontally buried linear object has a longitudinal extension. The method comprises moving, with a flying platform comprising a radar for synthetic aperture radar, SAR, vertical imaging, along a trajectory corresponding to a synthetic aperture. The method further comprises transmitting and receiving radar signals while moving along the trajectory corresponding to the synthetic aperture. The method also comprises forming a SAR image based on collected data representing radar signal reflections from the ground. The method additionally comprises detecting one or more features in the formed SAR image relating to the horizontally buried linear object. Said trajectory is oriented in a direction substantially perpendicular to an expected orientation of the longitudinal extension of the horizontally buried object and traversing the horizontally buried object.

By traversing the horizontally buried linear object at an essentially right angle, the radar response of the horizontally buried linear object becomes constantly specular; in contrast to the nadir return, which just adds to the radar response for the time it takes for the flying platform to cross the first Fresnel zone over the horizontally buried linear object, the radar response from the horizontally buried linear object accumulates coherently for the entire SAR track, i.e. the entire trajectory. Hence, for horizontally buried linear objects the method enables obtaining a radar response that is typically much stronger than when imaging the horizontally buried linear object from a track parallel to the horizontally buried linear object, whereas for the nadir return the response from any point just adds when crossing the first Fresnel zone. The accumulated radar response typically also becomes significantly strong for detection, i.e. horizontally buried linear objects traversed at essentially right angles can become competitive in radar cross section, RCS, to a ground surface. In contrast to the ground surface, the horizontally buried linear object can be resolved in full with aperture and bandwidth, just as ground surface targets are resolved to a small surface footprint in the normal ground SAR imaging mode.

According to some aspects, substantially perpendicular comprises an incident angle of the direction of the flying platform with respect to the longitudinal extension of the horizontally buried object between eighty degrees and one hundred degrees, preferably between eighty-five degrees and ninety-five degrees, more preferably between eighty-seven degrees and ninety-three degrees, yet more preferably between eighty-eight degrees and ninety-two degrees, and yet even more preferably between eighty-nine degrees and ninety-one degrees. While the horizontally buried linear object will typically provide the strongest accumulated radar response when the trajectory of the flying platform is perpendicular to the longitudinal extension of the horizontally buried linear object, i.e. an incident angle of ninety degrees, the method will degrade gracefully with increasing deviations from an incident angle of ninety degrees, as indicated by the cited incident angle intervals.

According to some aspects, the method further comprises excluding data relating to received radar reflections at an aperture position at nadir of the flying platform during a duration including the flying platform passing over the horizontally buried linear object, the data being excluded during said duration based on a nadir reflectivity contribution of the received radar reflections meeting a first criterion. According to some aspects, the first criterion comprises the nadir reflectivity contribution exceeding a radar signal reflectivity contribution of the horizontally buried linear object. According to some aspects, the first criterion comprises the nadir reflectivity contribution relating to received radar reflections from a first Fresnel zone.

The nadir reflectivity contribution may increase dramatically in the vicinity of the horizontally buried linear object and may drown the reflectivity contribution from the horizontally buried linear object when summing up all reflectivity contribution, thereby making it more difficult or even impossible to detect the horizontally buried linear object. By excluding data in the region where the nadir reflectivity contribution dominates, the reflectivity contributions from the horizontally buried linear object before and after entering the region where data is excluded enables detection of the horizontally buried linear object.

According to some aspects, the step of excluding data comprises turning off the radar during said duration including the flying platform passing over the horizontally buried linear object. According to some aspects, the step of excluding data comprises zeroing said data relating to received radar reflections at an aperture position at nadir of the flying platform during said duration including the flying platform passing over the horizontally buried linear object. Turning off the radar during said duration and zeroing the data both enable exclusion of data relating to reflectivity contributions when the nadir reflectivity contributions dominate over the reflectivity contributions from the horizontally buried linear object, which typically occur during a short duration from just before passing over the horizontally buried linear object to just after.

According to some aspects, the step of excluding data comprises applying zero Doppler removal. Applying zero Doppler removal enables a reduction of the size of the region in which data is excluded. In order to be on the safe side, data will often be excluded in a region wider than the first Fresnel zone; zero Doppler removal enables keeping the safety margin (in the form of a wider region) down.

According to some aspects, transmitting and receiving radar signals further comprises focusing the transmitted radar signal based on a received nadir radar signal reflection. According to some aspects, focusing the transmitted radar signal comprises determining a flight height of the flying platform based on the received nadir radar signal reflection. Focusing the transmitted radar signal further comprises determining a refractive index of the ground based on a signal strength of the received nadir radar signal reflection. Focusing the transmitted radar signal is based on the determined flight height and the determined refractive index. The ground in which the linear object is horizontally buried has a different refractive index than the air through which the radar signals must pass to reach the ground. The radar signals will change direction and propagation speed at the ground-air interface due to the difference in refractive indices of the ground and the air. The received nadir radar signal reflection can be used to determine both the refractive index of the ground as well as the altitude of the flying platform, thereby enabling taking the effect of refractive index differences into account.

According to some aspects, transmitting and receiving radar signals further comprises transmitting and receiving a radar signal in a direction parallel to the trajectory of the flying platform using one or more dipole antennas oriented at right angles to the trajectory. By orienting one of the antennas horizontally and the other vertically, the different polarizations thereby excited assist in differentiating between surface objects and buried objects. In particular, the dipole antennas may enhance suppression of ground clutter.

According to some aspects, the radar is configured for meter wave SAR technology.

According to some aspects, the radar is configured to transmit and receive radar signals in a first frequency band from ten megahertz to one hundred megahertz, preferably from twenty megahertz to ninety megahertz, and more preferably from twenty-seven to eighty-three megahertz. According to some aspects, the radar is configured to transmit and receive radar signals in a second frequency band from one hundred and ten megahertz to three hundred and eighty megahertz, preferably from one hundred and twenty megahertz to three hundred and seventy megahertz, and more preferably from one hundred and thirty-seven megahertz to three hundred and fifty-eight megahertz. Meter wave technology is less sensitive to variations in ground variations than sub-meter wavelength technology. Meter wave length technology further provides desirable trade-offs between ground penetration and resolution.

The present disclosure also relates to a computer program comprising computer program code which, when executed in a processor, causes the processor to carry out the method as described above and below. The computer program has all the technical features of the disclosed method and therefore has all the associated technical effects and advantages.

The present disclosure further relates to a radar system for detecting a horizontally buried linear object, wherein the horizontally buried linear object has a longitudinal extension. The radar system comprises an antenna system. The antenna system comprises a pair of antenna arrangements. Each antenna arrangement comprises a first antenna element configured to transmit and receive mono-polarized radar signals. The first antenna element has first and second ends. Each antenna arrangement further comprises a second antenna element configured to transmit and receive dual-polarized radar signals. The second antenna element is arranged at the second end of the first antenna. The second antenna is arranged to transmit the dual-polarized radar signals in a direction orthogonal to the mono-polarized radar signals. The antenna arrangements are arranged mirror-symmetrically about a common mirror-plane, with the first antenna elements lying in respective planes parallel to the mirror plane and the second antenna elements lying in a common plane orthogonal to the mirror-plane. The antenna system further comprises control circuitry configured to control the radar and to carry out the method as described above and below. According to some aspects, the control circuitry comprises a processor and a memory. The memory is configured to store a computer program as described above and below. The processor is configured to execute the program when stored on the memory. The radar system has all the technical features of the disclosed method and therefore has all the associated technical effects and advantages.

The present disclosure also relates to a flying platform for detecting a horizontally buried linear object, wherein the horizontally buried linear object has a longitudinal extension. The flying platform comprises a radar system as described above and below. The antenna system is mounted on the flying platform such that the dual-polarized radar signals are transmitted in a direction parallel to the flight direction of the flying platform. The flying platform has all the technical features of the disclosed method and therefore has all the associated technical effects and advantages.

The present disclosure additionally relates to an antenna system for detecting a horizontally buried linear object, wherein the horizontally buried linear object has a longitudinal extension. The radar comprises a pair of antenna arrangements. Each antenna arrangement comprises a first antenna element configured to transmit and receive mono-polarized radar signals. The first antenna element has first and second ends. Each antenna arrangement further comprises a second antenna element configured to transmit and receive dual-polarized radar signals. The second antenna element is arranged at the second end of the first antenna. The second antenna is arranged to transmit the dual-polarized radar signals in a direction orthogonal to the mono-polarized radar signals. The antenna arrangements are arranged mirror-symmetrically about a common mirror-plane, with the first antenna elements lying in respective planes parallel to the mirror plane and the second antenna elements lying in a common plane orthogonal to the mirror-plane.

BRIEF DESCRIPTION OF THE DRAWINGS

FIG. 1 illustrates method steps of the disclosed method.

DETAILED DESCRIPTION

Figure 2:
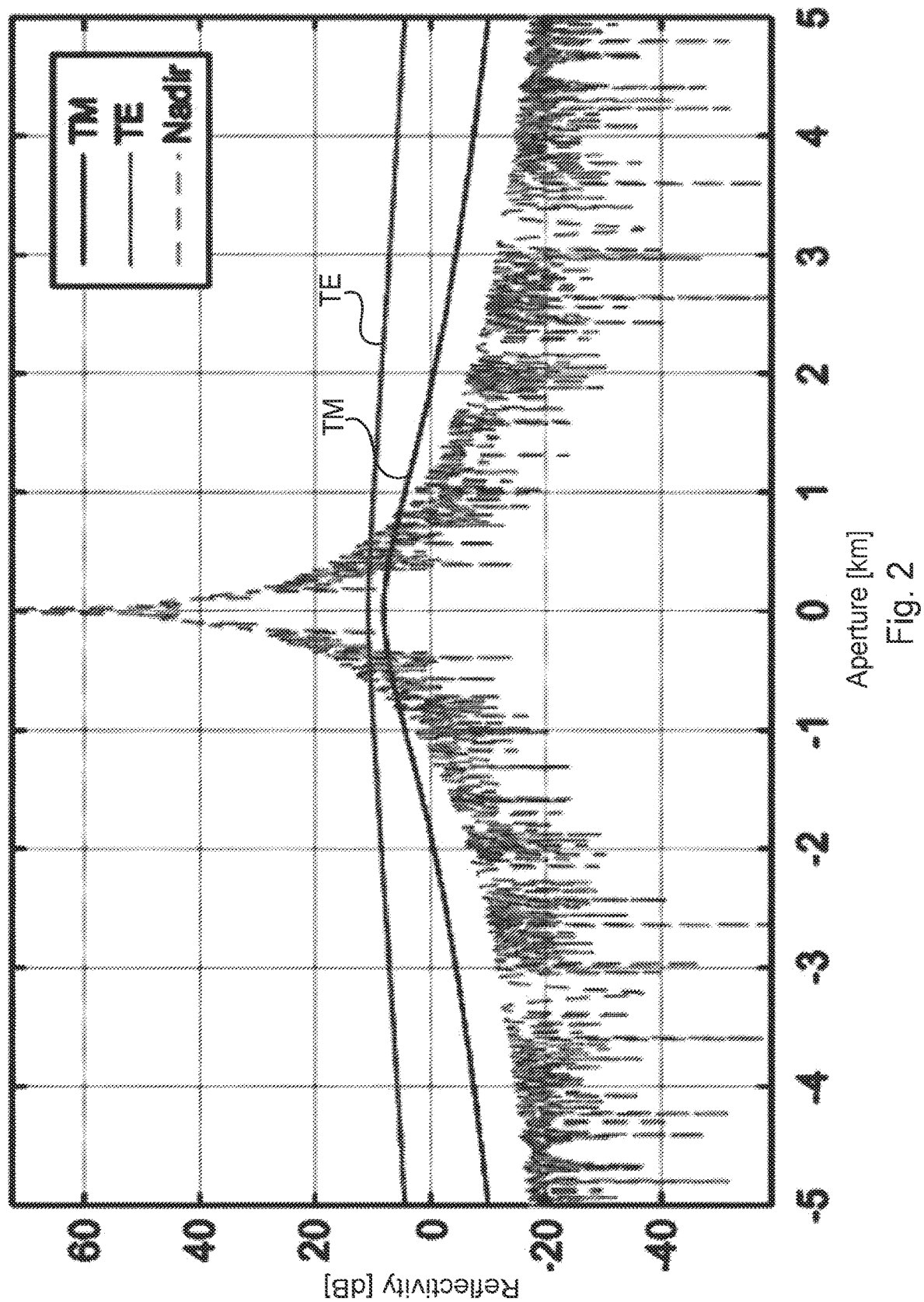
FIG. 2 illustrates a radar system and an antenna system.

Conventionally synthetic aperture radar, SAR, is used for imaging a ground surface. The imaging geometry is that of a flying platform, e.g. a helicopter, airplane or satellite, comprising a radar suitable for SAR imaging traversing an area to be imaged and directing radiation to either side of the aircraft. From the backscattered signal an image of the illuminated area is obtained. When it comes to SAR imaging it is today known to perform SAR imaging by looking sideways from the flying platform performing the SAR imaging with its radar. There are two compelling reasons why; first, when viewed sideways objects are better focused and thus respond much stronger than objects viewed in the path of the flying platform; secondly, the nadir response will drown out reflections from objects viewed in front (and back) of the flying platform. The inventor has discovered an exception in the form of horizontally buried linear objects. When horizontally buried linear objects are traversed at right angles with respect to their longitudinal extension, their lack of focusing will be in their direction of extension and thus have no effect. Moreover their reflectivity contributions will accumulate over the entire aperture track, while the nadir response will only contribute during a short duration between just before to just after the flying platform passes over the horizontally buried linear object, typically approximately corresponding to the first Fresnel zone. If needed, data relating to the nadir response can be largely excluded, thereby leaving the reflectivity contributions from the horizontally buried linear object before and after the duration where data has been excluded, thereby typically enabling detection of the horizontally buried linear object. This is further illustrated in relation to FIG. 1, below.

FIG. 1 illustrates a method for detecting a horizontally buried linear object, the horizontally buried linear object having a longitudinal extension. The method comprises moving S10, with a flying platform comprising a radar for synthetic aperture radar, SAR, vertical imaging, along a trajectory corresponding to a synthetic aperture. The method further comprises transmitting S20 and receiving radar signals while moving along the trajectory corresponding to the synthetic aperture. According to some aspects, the trajectory is moved along at constant altitude. The method also comprises forming S30 a SAR image based on collected data representing radar signal reflections received from the ground. From the ground herein means all the received radar signal reflections, and may thus be reflections from objects on or protruding from the ground surface as well as signals having been reflected from below the ground surface. The method additionally comprises detecting S40 one or more features in the formed SAR image relating to the horizontally buried linear object, wherein said trajectory being oriented in a direction substantially perpendicular to an expected orientation of the longitudinal extension of the horizontally buried object and traversing the horizontally buried object.

In the following, the method will be discussed in terms of the trajectory being perpendicular to the expected orientation of the longitudinal extension of the horizontally buried object. The method will also work for incident angles that deviate slightly from perpendicular, i.e. ninety degrees.

In other words, according to some aspects, substantially perpendicular comprises an incident angle of the direction of the flying platform with respect to the longitudinal extension of the horizontally buried object between eighty degrees and one hundred degrees, preferably between eighty-five degrees and ninety-five degrees, more preferably between eighty-seven degrees and ninety-three degrees, yet more preferably between eighty-eight degrees and ninety-two degrees, and yet even more preferably between eighty-nine degrees and ninety-one degrees.

The method proposed here is to use SAR for depth profiling in a vertical direction below the track, i.e. trajectory, of the flying platform. Imaging in the vertical plane provides azimuth, i.e. along track resolution just as for ordinary SAR imaging of the ground surface. When imaging the ground surface the azimuth resolution combines with radar bandwidth in subdividing the ground surface into resolution elements. The SAR resolution cell extends uncontrollably in a vertical direction, with objects rising above the ground surface as well as subsurface responses being projected on a two-dimensional SAR image. Typically the elevation of an object will be noticeable indirectly in the SAR image in the intensity, i.e. radar cross section, RCS, of the response in the resolution cell containing the object. Thus, objects which are flush with the ground will not be seen in the SAR image, whereas, e.g. the resolution cell intensity for a tree grows with tree height squared.

For SAR imaging in a vertical plane, bandwidth will provide depth resolution, so the radar will work as a depth profiling device. In this case radar bandwidth provides very poor resolution in the horizontal cross track direction. This means in particular that there will be a strong nadir return from the ground itself. For smooth ground the strength of the return is determined by the wave-front hitting the ground, in relation to radar wavelength. In effect the ground response is that of the ground surface contained in the so-called first Fresnel zone determined by this ratio.

For microwaves the first Fresnel zone is small, making the specular return relatively small. Also, on the scale of microwaves, the ground is seldom flat as compared to the wavelength. However, for meter wave radar the return becomes very significant. It will unfavourably influence the detectability of the generally weak subsurface returns.

Flying at constant altitude, the specular nadir return appears as a strong constant amplitude, i.e. direct current, DC, component in radar data. The DC property allows its suppression by Doppler filtering, removing the zero Doppler component. The point target responses spread uniformly in Doppler and will thus not be significantly degraded in this process. Most importantly there will also be non-DC components in the nadir return, remaining after the Doppler filtering. In typical surface imaging meter wave SAR applications, radar waveforms are chosen so that radar only is captured when the nadir response has declined, i.e. for ground areas which are well beside the area right below the flying platform. When instead suppressing nadir by Doppler filtering, small targets in or close to the nadir direction, in particular small subsurface targets, have to compete with the remaining non-zero nadir Doppler returns. Due to the lack of focusing in the cross track dimension, the nadir returns may well be significantly stronger than the targets, and prevent the detectability of the targets.

There is an important exception to target responses being weak due to lack of focusing in the along-track direction, namely responses from horizontally buried linear objects at right angles to the track of the flying platform. Examples comprise buried cables, pipes and tunnels, which may just be cavities in the subsurface medium. Traversing these at right angles, their radar response becomes invariably specular just as is the case for the nadir response from ground surface below the flying platform. However, in contrast to the nadir return, just adding to the radar response for the time it takes for the aircraft to cross the first Fresnel zone patch in the ground, over the horizontally buried linear object, the response from the horizontally buried linear object continues to accumulate coherently for the entire SAR track. Note that also when imaging a linear target parallel to the SAR track, the contribution from some position along the said target will only come from the limited time the flying platform traverses the first Fresnel zone comprising said position. Thus, in conclusion the accumulated response from the horizontally buried linear object becomes significantly strong and certainly stronger than when imaging the target from a track parallel to the horizontally buried linear object.

Hence, linear objects traversed at right angles can become competitive in RCS with respect to the ground surface. In contrast to the ground surface, they can be resolved in full with aperture and bandwidth, just as the ground surface targets are resolved to a small surface footprint in the normal ground surface SAR imaging mode.

The disclosed method of detecting horizontally buried linear objects generally extends from object diameters small to large compared to radar wavelength. With an antenna directed in the horizontal cross range, also objects of small diameter, such as underground cables, could potentially be detected, as will be described further below.

The principles of the disclosed method will be illustrated in detail for a horizontally buried cylinder. The method is however not limited to horizontally buried cylinders, but relates to all horizontally buried linear objects. By a linear object is meant an object which is essentially one-dimensional with respect a leading dimension, i.e. the objects longitudinal extension.

First, the nadir response from the flat ground will be described. Then the radar cross section from an infinitely extended horizontally buried cylinder will be described. Finally, a comparison between the nadir response and the RCS of the cylinder will be described. From the comparison it will be illustrated what level of suppression of the nadir DC terms will be required in order to make buried cylinders detectable. The illustrated principles apply mutatis mutandis to general horizontally buried linear objects.

Nadir Reflectivity

The nadir response will be described first. As mentioned above, it arises by the essentially omnidirectional, e.g. meter wave, antenna radiation pattern being specularly reflected by the ground. It will be assumed that the ground is flat compared to the wavelength. The specular reflection might in this case be considered as the signal impinging from an antenna right below the radar at a distance of twice its altitude and reduced due to the ground Fresnel coefficient $(\eta-1)/(\eta+1)$. It can thus be modelled as a phenomenon arising by one-way propagation whereas backscattering from oblique incidence angles arises as backscattering from spherical waves and thus two-way propagation. Consequently, the nadir echo will become very pronounced.

Thus, given a flying platform height, h, the relation between received, $P_{RX}$, and transmitted, $P_{TX}$, power is $$P_{RX} = \left(\frac{\eta-1}{\eta+1}\right)^2 \Gamma^2 \frac{\lambda_{min}^2}{4\pi(2h)^2} P_{TX} \qquad (2.1)$$

Assume $\Gamma=1$, by which (2.1) represents the case of an isotropic antenna with equalized antenna transmissivity.

As for deriving the nadir response reflectivity, the generic expression for a ground reflectivity density distribution $\Lambda(R, \phi)$, with ground plane polar coordinates R, $\phi$ and with $r=\sqrt{h^2+R^2}$ the three-dimensional range, $$f^{RX}(t) = \int_{R=0}^{\infty} \Lambda(R, \phi) f^{TX}\left(t - 2\frac{r}{c}\right) \frac{dA_{R,\phi}}{r^2} \qquad (2.2)$$

As seen, $\Lambda(R, \phi)$ provides the fraction of the incident signal impinging on the surface position R, $\phi$ which is backscattered. Given this role $\Lambda(R, \phi)$ will be real and positive. From (2.2) the (three-dimensional) range reflectivity density $\gamma(r)$ for the radar at the height, h, above the flat ground, will be derived. This is associated to $f^{RX}(t)$, $f^{TX}(t)$ according to $$f^{RX}(t) = \int_0^{\infty} \gamma(r) f^{TX}(t-2r/c) \frac{dr}{r} \Rightarrow \left(\frac{\gamma(r)}{r}\right)_{2\omega r/c} = \frac{f_\omega^{RX}}{f_\omega^{TX}} \qquad (2.3)$$

Due to ground surface flatness and homogeneity $\Lambda(R, \phi)$ must be constant, denoted $\Lambda_0$. For each Fourier component of (2.2)

$$f_\omega^{RX} = \Lambda_0 f_\omega^{TX} \int_{\rho=0}^{\infty} e^{-i2\omega\frac{\sqrt{h^2+R^2}}{c}} \frac{dA_R}{h^2 + R^2} \qquad (2.4)$$

The integrand only contributes when $\rho$ is small, indeed only for exponent values less than $\pi/2$ during which an exponent mean value $\pi/4$ may be assumed. Thus, in a first order expansion of small R $$\frac{2\omega}{c}\sqrt{h^2+R^2} \approx \frac{2\omega}{c}\left(h + \frac{R^2}{2h}\right); \frac{\omega}{ch}R^2 \leq \frac{\pi}{2} \Rightarrow R \leq \sqrt{\frac{\pi c h}{2\omega}} = \frac{\sqrt{\lambda h}}{2} \qquad (2.5)$$

Hence $$f_\omega^{RX} = \Lambda_0 f_\omega^{TX} e^{i\int_{R=0}^{\sqrt{\frac{\pi c h}{2\omega}}} e^{-i2\omega\frac{\sqrt{h^2+R^2}}{c}} \frac{dA_R}{h^2+R^2}} = e^{-i\left(\frac{2\omega h}{c}+\pi/4\right)} \frac{\pi^2 c}{2h\omega} \Lambda_0 f_\omega^{TX} \qquad (2.6)$$

Now reconcile (2.6) with (2.1), observing $$P_{RX} = \frac{1}{(2\pi)^2} \int_{\omega_c-\pi B}^{\omega_c+\pi B} |f_\omega^{RX}|^2 d\omega \qquad (2.7)$$

$$f_\omega^{TX} = \text{constant} = \sqrt{\frac{P_{TX}}{2\pi B}}$$

It follows, with fractional bandwidth $\beta=2\pi B/\omega_{max}$, $$\Lambda_0 = 2\sqrt{\frac{1-\beta}{\pi}}\left(\frac{\eta-1}{\eta+1}\right) \qquad (2.8)$$

The range response SAR images will be presented in slant range coordinates ρ, y, presently with slant range planes in a near vertical direction.

Comparing (2.6) (having inserted the result in (2.8)) with (2.3) and noticing the slow variation of r around h, the conversion from radar data to SAR image reflectivity distribution can be derived to $$\hat{\gamma}_{k_p,k_y} = \pi v \sqrt{\frac{2h(1-\beta)}{k_\rho}} \left(\frac{\eta-1}{\eta+1}\right) e^{-ihk_\rho} \delta(vk_y) \quad (2.9)$$

The SAR image spectral support is for $k_\rho$ given in terms of centre frequency $\omega_c$, and bandwidth $2\pi B$. For the slow variation in the denominator of $$(2.9) \; k_\rho = \frac{2\omega_c}{c} = 4\pi/\lambda_c$$

may be assumed. The maximum reflectivity (reflectivity density squared) occurs when $\rho \to h$.

Invoking the radar equation for the radar cross section, RCS, of the nadir response and combining with (2.1) gives $$RCS = \pi \left(\frac{\eta-1}{\eta+1}\right)^2 4\pi h^2 \quad (2.10)$$

There is an alternative way of deriving (2.1) based on Kirchhoff's integral theorem for scattering. Specifically, what appears as the response of the flying platform mirror image in the ground can alternatively be envisaged as the response from the illuminated ground surface. It can be shown that effective contributions to received power across the antenna area $\lambda_{min}$ only comes from a small area within a radius $R_0$, wherein $$R_0 = \sqrt{\frac{h\lambda_{min}}{2}} \quad (2.11)$$

In effect the width of the nadir response in the SAR image will be at best $2R_0$. Generally resolution will be coarser. Further, it can be shown that the RCS calibrated intensity is given by $$|\hat{\gamma}_{RCS}(h,y)|^2 = 8\pi^2 \left(\frac{\eta-1}{\eta+1}\right)^2 \frac{h\sqrt{\beta}}{\lambda_{min}} \quad (2.12)$$

Due to the very strong nadir response, which competes with the subsurface cylinder response, suppression of the nadir response may require the use of excluding the data at some interval around where the radar passes by the buried cylinder and/or applying Doppler filtering in order to exclude data at said interval, i.e. applying zero Doppler removal.

Cylinder Reflectivity

Consider a horizontal cylinder of infinite extension, which is traversed at right angles by the flying platform. In analogy to what was demonstrated for the nadir response by equation (2.9), even though the cylinder may be infinite, the response from the cylinder only arises over a cylinder segment of finite length. The responding part is extending symmetrically on either side of the trajectory of the flying platform and with length L increasing with range, just as the slant range expression in (2.9) increases with height.

However, in contrast to the flat ground, the cylinder response is wavelength dependent and (2.9) has to be modified accordingly. Actually, equation (2.9) can be understood as a consequence of that even for monochromatic signals the cylinder response will come from a certain wavelength. The extension according to (2.9) can never be smaller than for the wavelength that such bandwidth necessitates. The extension L, for any given wavelength λ is given by the first Fresnel zone, i.e. for range variations variation less than λ/8. The restriction to one eight of the wavelength corresponds to a ninety degree phase change for backscattering due to a forty-five degree phase change of the impinging signal along the cylinder.

Due to the theorem of chords $$L_\lambda \approx \sqrt{r\lambda} \quad (3.1)$$

By inserting eq. (3.1) into cylinder RCS expressions for length L and frequency co, it can be shown that the normal dependence on $L^2$ makes RCS increase linearly with range.

Signal paths to any cylinder position (x, 0, −d) from the flying platform position (0, y, h) is determined by minimum time for passage, with the speed above ground being the speed of light and the speed below ground being reduced by a factor of the refractive index of the ground. In other words, the signal path will obey Snell's law.

The fact that the cylinder is buried can be seen to have only a marginal effect on $L_\lambda$, a few percent for realistic parameter values. The reason is mainly that there are two mechanisms that counteract each other in determining $L_\lambda$. One is that the subsurface wavelength is reduced by the index of refraction, which would reduce $L_\lambda$. The other is that due to Snell's law the duration of transmitted rays are changed when entering into the ground, as if emerging from a source further away than the actual radar flying platform. The curvature of the wave front is thus enlarged when propagating into the ground, thereby to a degree compensating for the decrease in wavelength. Hence (3.1) remains approximately valid and may be used for the extension of the scattering part.

Radar cross section expresses backscatter energy compared to impinging energy. Since energy distributed over different frequencies or time intervals just adds, the scattering cross section for a signal distributed over different time intervals or frequencies will be the average of each of these RCS values. Specifically, we have $$\sigma = \frac{1}{4\pi TB} \int_{-\omega_c\pi B}^{\omega_c+\pi B} \int_{-T}^{T} \sigma(\omega, t) dt d\omega \quad (3.2)$$

How the maximum reflectivity compares to noise and the competing nadir reflectivity decides detectability of the buried cylinder.

Nadir Mitigation

To investigate the influence of the nadir response on buried cylinder detectability it is of interest to compare $$\frac{d\sigma}{dy} = \frac{1}{4\pi TB} \int_{\omega_c-\pi B}^{\omega_c+\pi B} \sigma(\omega, t) dt \quad (4.1)$$

obtained from (3.2) with the maximum reflectivity, i.e. the reflectivity density squared, of the nadir response.

Turning to FIG. 2, comparative reflectivity levels along aperture for nadir and cavity cylinder from an altitude of a thousand meters in a typical medium (index of refraction 3+0.1i) is illustrated for a two meter in diameter cylinder buried horizontally ten meters down. FIG. 2 relates to a band mode operating across twenty-seven point five MHz to eighty-two point five MHz.

Ordinate values are given as reflectivity instead of reflectivity derivatives. The ordinate values give the reflectivity for each aperture point as if the reflectivity contribution from that point would have been constant along the entire aperture. The actual reflectivity will be the means values of the reflectivity values along the aperture as given in FIG. 2.

If the SAR image noise floor is known, the detectability of buried cylinders can be concluded. For the example of FIG. 2, reflectivity values above minus twenty dB are above the SAR image noise floor.

From FIG. 2 it can be seen that the exceedingly high reflectivity values of the nadir, even when appearing just for a small part of the aperture, will result in an average nadir reflectivity effectively drowning the cylinder reflectivity.

Returning to FIG. 1, it is apparent that there may be a need to exclude data at aperture position near nadir.

Thus, according to some aspects, the method comprises excluding S26 data relating to received radar reflections at an aperture position at nadir of the flying platform during a duration including the flying platform passing over the horizontally buried linear object, the data being excluded during said duration based on a nadir reflectivity contribution of the received radar reflections meeting a first criterion. According to some aspects, the first criterion comprises the nadir reflectivity contribution exceeding a radar signal reflectivity contribution of the horizontally buried linear object. According to some aspects, the first criterion comprises the nadir reflectivity contribution relating to received radar reflections from a first Fresnel zone.

Though such suppression could be achieved by zero Doppler cancellation, that particular method requires perfect homogeneity of the ground below the aircraft path, which would almost never be the case. Thus, it is generally preferable to just skip, for the SAR processing, the part of the aperture where the nadir reflectivity dominates over the cylinder reflectivity. In principle, this could be achieved by temporarily turning of the radar. Therefore, according to some aspects, the step of excluding S26 data comprises turning off S262 the radar during said duration including the flying platform passing over the horizontally buried linear object. It is typically more preferable and convenient to zero the data to be excluded. Thus, according to some aspects, the step of excluding S26 data comprises zeroing S264 said data relating to received radar reflections at an aperture position at nadir of the flying platform during said duration including the flying platform passing over the horizontally buried linear object. This is particularly advantageous when the flying platform travels distances longer than that of the aperture trajectory. In such cases, there will be several overlapping aperture trajectories, each with respective regions of excluded data. In other words, the exclusion of data may be performed continuously, e.g. along the trajectory of the aperture.

The negative influence of the nadir response is not entirely removed, since the side lobes of the nadir response from other azimuth position will still be present in the SAR images. The situation is thus similar as for ordinary surface SAR imaging with the nadir response present. However, due to its extension, the cylinder is a very strong target compared to the surface targets normally encountered, making nadir residuals a lesser problem. Applying zero Doppler removal in combination with the use of partial apertures may be advantageous in that a smaller window of excluded data may typically be used. Thus, according to some aspects, the step of excluding S26 data comprises applying S266 zero Doppler removal.

Furthermore, transverse electric, TE, polarization tends to exhibit more favourable response, see e.g. FIG. 2, but will pick up ground clutter more strongly than transverse magnetic, TM, polarization. Thus, according to some aspect, transmitting S20 and receiving radar signals further comprises transmitting S24 and receiving a radar signal in a direction parallel to the trajectory of the flying platform using one or more dipole antennas oriented at right angles to the trajectory.

As has been described above, lack of focusing in the cross track dimension may prevent the detectability of the targets. Focusing can be enhanced by taking into account the bending and the radar signals at the ground-air interface. This can be done by taking into account the differences in refractive indices. The refractive index of the ground can be determined based on the received nadir radar signal reflection. Thus, according to some aspects, transmitting S20 and receiving radar signals further comprises focusing S22 the transmitted radar signal based on a received nadir radar signal reflection.

Specifically, according to some aspects, focusing S22 the transmitted radar signal comprises determining S221 a flight height of the flying platform based on the received nadir radar signal reflection. Focusing S22 the transmitted radar signal further comprises determining S222 a refractive index of the ground based on a signal strength of the received nadir radar signal reflection. Also, focusing S22 the transmitted radar signal is based on the determined flight height and the determined refractive index.

According to some preferred aspects, the radar is configured for meter wave SAR technology. In other words, transmitting S20 and receiving radar signals comprises transmitting meter wavelength radar signals.

According to some aspects, the radar is configured to transmit and receive radar signals in a first frequency band from ten megahertz to one hundred megahertz, preferably from twenty megahertz to ninety megahertz, and more preferably from twenty-seven to eighty-three megahertz. Stated differently, transmitting S20 and receiving radar signals comprises transmitting and receiving radar signals within said first frequency band.

According to some aspects, the radar is configured to transmit and receive radar signals in a second frequency band from one hundred and ten megahertz to three hundred and eighty megahertz, preferably from one hundred and twenty megahertz to three hundred and seventy megahertz, and more preferably from one hundred and thirty-seven megahertz to three hundred and fifty-eight megahertz. Stated differently, transmitting S20 and receiving radar signals comprises transmitting and receiving radar signals within said second frequency band.

The present disclosure also relates to a computer program comprising computer program code which, when executed in a processor, causes the processor to carry out the disclosed method.

Figure 3:
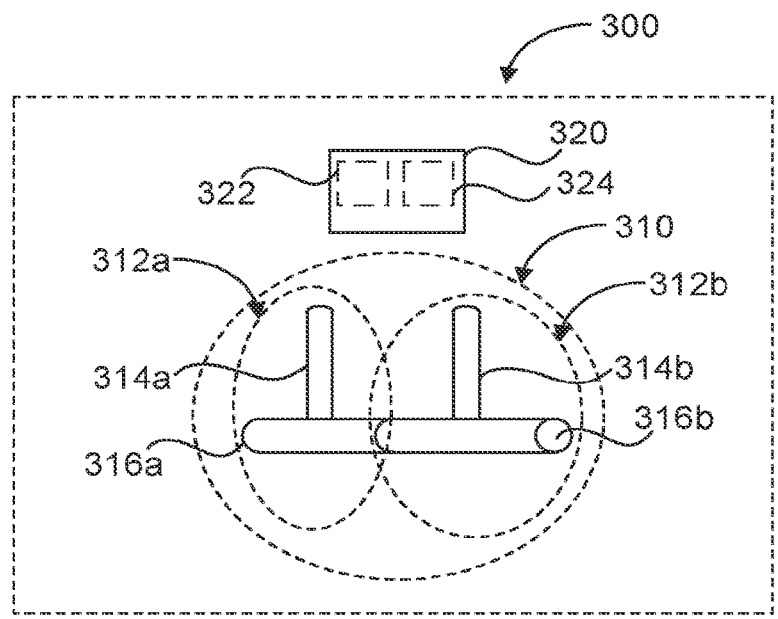
FIG. 3 illustrates a flying platform according to the present disclose.

FIG. 3 illustrates a radar system 300 for detecting a horizontally buried linear object, the horizontally buried linear object having a longitudinal extension. The radar system comprises an antenna system 310. The antenna system comprises a pair of antenna arrangements 312a, 312b. Each antenna arrangement 312a, 312b comprises a first antenna element 314a, 314b configured to transmit and receive mono-polarized radar signals. The first antenna element 314a, 314b has first and second ends. Each antenna arrangement 312a, 312b further comprises a second antenna element 316a, 316b configured to transmit and receive dual-polarized radar signals. The second antenna element 316a, 316b is arranged at the second end of the first antenna element 314a, 314b. The second antenna element 316a, 316b is arranged to transmit the dual-polarized radar signals in a direction orthogonal to the mono-polarized radar signals. The antenna arrangements 312a, 312b are arranged mirror-symmetrically about a common mirror-plane, with the first antenna elements lying in respective planes parallel to the mirror plane and the second antenna elements lying in a common plane orthogonal to the mirror-plane. The radar system further comprises control circuitry 320 configured to control the radar and to carry out the method as disclosed above and below. According to some aspects, the control circuitry 320 comprises a processor 322 and a memory 324. The memory 324 is configured to store a computer program as described above and below. The processor 322 is configured to execute the program when stored on the memory 324. The radar system has all the technical features of the disclosed method and thus has all the technical effects and advantages. The antenna system 310 may also be separate from the radar system 300, i.e. an independent entity.

Figure 4A:
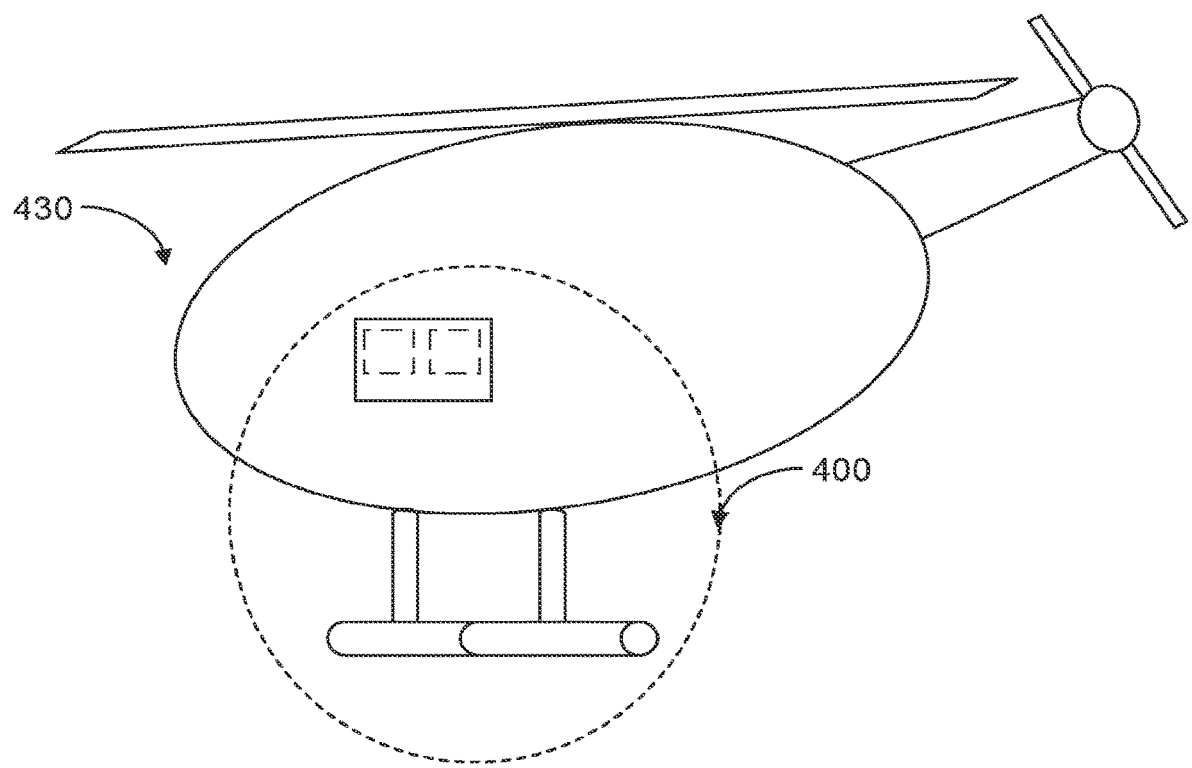
FIGS. 4a-4c illustrate exemplary transmission and reception of radar signals from a flying platform for detecting a horizontally buried linear object.

FIG. 4a illustrates a flying platform 430 for detecting a horizontally buried linear object, the horizontally buried linear object having a longitudinal extension. The flying platform 430 comprising a radar system 400 for synthetic aperture radar, SAR, vertical imaging of a horizontally buried linear object. The radar system comprises an antenna system. The antenna system comprises a pair of antenna arrangements. Each antenna arrangement comprises a first antenna element configured to transmit and receive mono-polarized radar signals. The first antenna element has first and second ends. Each antenna arrangement further comprises a second antenna element configured to transmit and receive dual-polarized radar signals. The second antenna element is arranged at the second end of the first antenna element. The second antenna element is arranged to transmit the dual-polarized radar signals in a direction orthogonal to the mono-polarized radar signals. The antenna arrangements are arranged mirror-symmetrically about a common mirror-plane, with the first antenna elements lying in respective planes parallel to the mirror plane and the second antenna elements lying in a common plane orthogonal to the mirror-plane. The radar system further comprises control circuitry configured to control the radar and to carry out the method as disclosed above and below. According to some aspects, the control circuitry comprises a processor and a memory. The memory is configured to store a computer program as described above and below. The processor is configured to execute the program when stored on the memory. The antenna system is mounted on the flying platform 430 such that the dual-polarized radar signals are transmitted in a direction parallel to the flight direction of the flying platform. The flying platform 430 has all the technical features of the disclosed method and thus has all the technical effects and advantages. According to some aspects, the flying platform comprises a helicopter, an airplane, a satellite, an autonomous unmanned vehicle or an autonomous unmanned system. According to some aspects, the control circuitry is separate from the body of the flying platform, and the control circuitry and the flying platform are configured to communicate wirelessly with each other.

Figure 4B:
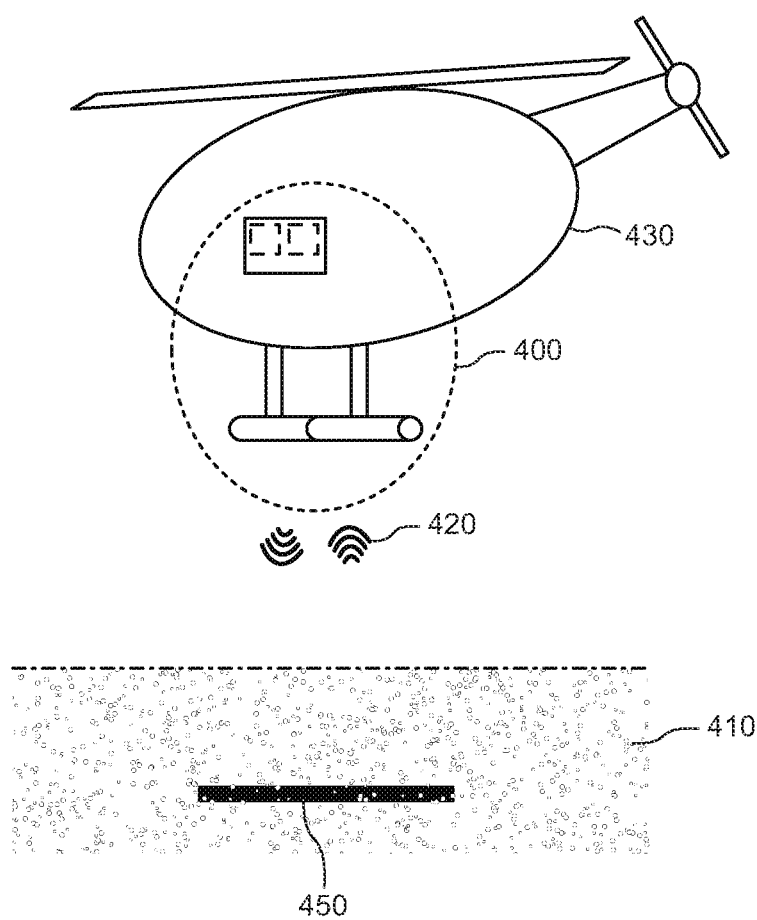

FIG. 4b illustrates an exemplary transmission and reception of radar signals from a flying platform for detecting a horizontally buried linear object. As shown in FIG. 4b, the flying platform 430 comprising a radar system 400 for synthetic aperture radar, SAR, vertical imaging of the horizontally buried linear object 450. The radar system 400 is configured to transmit and/or receive radar signals 420 for detecting the horizontally buried linear object 450. Particularly, the radar system 400 detects the horizontally buried linear object 450 based on radar reflections received from a ground surface 410.

Figure 4C:
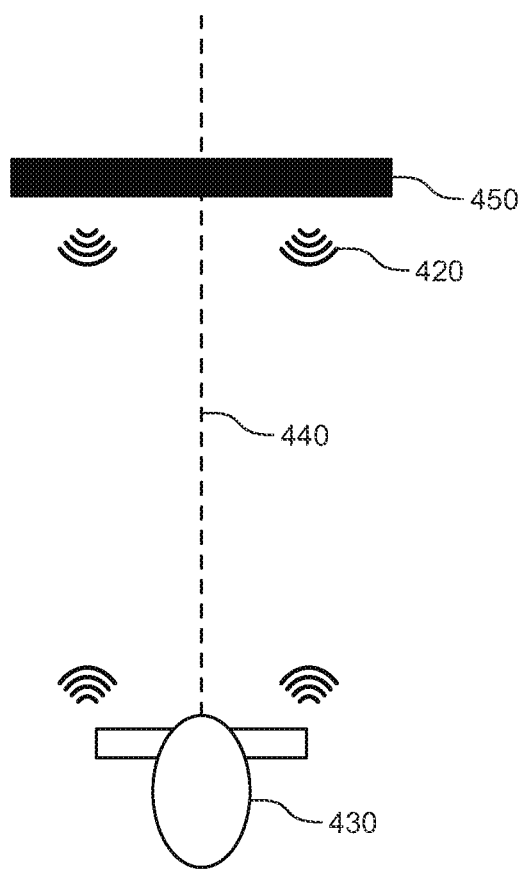

FIG. 4c illustrates an exemplary transmission and reception of a radar signal in a direction parallel to a trajectory of a flying platform using one or more dipole antennas oriented at right angles to the trajectory. As shown in FIG. 4c, the flying platform 430 is moved along the trajectory 440 while the one or more dipole antennas of the radar system 400 transmit/receive radar signals to/from horizontally buried linear object 450. The radar signals 420 are transmitted and received in a direction parallel to the trajectory 440 of the flying platform 430.

The invention claimed is:

1. A feature detection based method performed in a radar system for synthetic aperture radar, SAR, vertical imaging for detecting a horizontally buried linear object, the horizontally buried linear object having a longitudinal extension, while the radar system moves on a flying platform along a trajectory corresponding to a synthetic aperture, the method comprising:
 transmitting and receiving radar signals while moving along the trajectory corresponding to the synthetic aperture, wherein transmitting and receiving radar signals further comprises focusing the transmitted radar signal based on a received nadir radar signal reflection, wherein focusing the transmitted radar signal comprises:
   determining a flight height of the flying platform based on the received nadir radar signal reflection, and
   determining a refractive index of the ground based on a signal strength of the received nadir radar signal reflection,
 wherein focusing the transmitted radar signal is based on the determined flight height and the determined refractive index,
 forming a SAR image based on collected data representing radar signal reflections received from ground; and
 detecting one or more features in the formed SAR image relating to the horizontally buried linear object,
 wherein said trajectory being oriented in a direction substantially perpendicular to an expected orientation of the longitudinal extension of the horizontally buried object and traversing the horizontally buried object.

2. The feature detection based method according to claim 1, wherein substantially perpendicular comprises an incident angle of the direction of the flying platform with respect to the longitudinal extension of the horizontally buried object between eighty degrees and one hundred degrees.

3. The feature detection based method according to claim 1, further comprising:
 excluding data relating to received radar reflections at an aperture position at nadir of the flying platform during a duration including the flying platform passing over the horizontally buried linear object, the data being excluded during said duration based on a nadir reflectivity contribution of the received radar reflections meeting a first criterion.

4. The feature detection based method according to claim 3, wherein the first criterion comprises the nadir reflectivity contribution exceeding a radar signal reflectivity contribution of the horizontally buried linear object.

5. The feature detection based method according to claim 3, wherein the first criterion comprises the nadir reflectivity contribution relating to received radar reflections from a first Fresnel zone.

6. The feature detection based method according to claim 3, wherein excluding data comprises:
zeroing said data relating to received radar reflections at an aperture position at nadir of the flying platform during said duration including the flying platform passing over the horizontally buried linear object.

7. The feature detection based method according to claim 3, wherein excluding data comprises:
applying zero Doppler removal.

8. The feature detection based method according to claim 1, wherein the radar system is configured to transmit and receive radar signals in a frequency ranging from ten megahertz to three hundred and eighty megahertz.

9. The feature detection based method according to claim 1, wherein the radar system is configured to transmit and receive radar signals in a first frequency band ranging from ten megahertz to one hundred megahertz.

10. The feature detection based method according to claim 1, wherein the radar system is configured to transmit and receive radar signals in a second frequency band ranging from one hundred and ten megahertz to three hundred and eighty megahertz.

11. A non-transitory computer storage medium storing computer-executable instructions which, when executed in a processor in a radar system for synthetic aperture radar, SAR, vertical imaging that includes a control circuitry that is configured to detect a horizontally buried linear object having a longitudinal extension while said radar system moves on a flying platform along a trajectory corresponding to a synthetic aperture, causes the processor to perform operations comprising:
transmitting and receiving radar signals while moving along the trajectory corresponding to the synthetic aperture, wherein transmitting and receiving radar signals further comprises focusing the transmitted radar signal based on a received nadir radar signal reflection, wherein in focusing the transmitted radar signal, the processor is further caused to:
determine a flight height of the flying platform based on the received nadir radar signal reflection, and
determine a refractive index of the ground based on a signal strength of the received nadir radar signal reflection,
wherein focusing the transmitted radar signal is based on the determined flight height and the determined refractive index;
forming a SAR image based on collected data representing radar signal reflections received from ground; and
detecting one or more features in the formed SAR image relating to the horizontally buried linear object,
wherein said trajectory being oriented in a direction substantially perpendicular to an expected orientation of the longitudinal extension of the horizontally buried object and traversing the horizontally buried object.

12. The feature detection based method according to claim 1, wherein transmitting and receiving radar signals further comprises:
transmitting and receiving a radar signal in a direction parallel to the trajectory of the flying platform using one or more dipole antennas oriented at right angles to the trajectory.

* * * * *